United States Patent [19]

Yoshida et al.

[11] Patent Number: 4,610,525

[45] Date of Patent: Sep. 9, 1986

[54] ELECTRONIC FLASH DEVICE

[75] Inventors: Masaaki Yoshida; Hiroyuki Kataoka, both of Tokyo, Japan

[73] Assignee: Canon Kabushiki Kaisha, Tokyo, Japan

[21] Appl. No.: 758,842

[22] Filed: Jul. 25, 1985

Related U.S. Application Data

[63] Continuation of Ser. No. 603,992, Apr. 26, 1984, abandoned, which is a continuation of Ser. No. 454,232, Dec. 29, 1982, abandoned.

[30] Foreign Application Priority Data

Jan. 9, 1982 [JP] Japan ................................. 57-1965
Jun. 2, 1982 [JP] Japan ................................. 57-82036

[51] Int. Cl.4 ............................................. G03B 7/097
[52] U.S. Cl. .................................... 354/415; 354/416
[58] Field of Search ....................... 354/413, 415, 416

[56] References Cited

U.S. PATENT DOCUMENTS 4,305,647 12/1981 Ishida .................................. 354/414
4,465,353 8/1984 Yoshida et al. ..................... 354/415
4,501,481 2/1985 Kataoka et al. .................... 354/413

Primary Examiner—L. T. Hix
Assistant Examiner—David M. Gray
Attorney, Agent, or Firm—Toren, McGeady, Stanger, Goldberg & Kiel

[57] ABSTRACT

In a flash device arranged to determine the aperture value of a photo-taking lens according to the measured level of a reflection light obtained by preliminary flashing and to control main flashing according to a light control level corresponding to the aperture value, when a light diffusing panel is arranged in front of a main flashing part for a wider flash illuminating angle, another light diffusing panel which gives an equal light reducing effect is also arranged for a preliminary flashing part. The light quantity of preliminary flashing is thus reduced in proportion to the degree of reduction in the light quantity of main flashing, so that the aperture value set by preliminary flashing and the light controllable range of main flashing for photographing can be made to be always in agreement with each other.

5 Claims, 8 Drawing Figures

though one of which is not shown. A light diffusing panel 2 which is arranged to be attached to the body
ELECTRONIC FLASH DEVICE This is a continuation of application Ser. No. 603,992 filed Apr. 26, 1984, which in turn is a continuation application of Ser. No. 454,232 filed Dec. 29, 1982, both abandoned.

BACKGROUND OF THE INVENTION

1. Field of the Invention

This invention relates to an electronic flash device for a photographic camera and more particularly to a flash device which determines an aperture value through preliminary flashing and sets the light control level for main flashing according to this aperture value. The term "light control level" as used herein means a predetermined quantity of light received at which the main flashing is to be terminated.

2. Description of the Prior Art

It is well known that the quantity of flash light for an object to be photographed is reduced by diffusion of the flash light when a light diffusing panel is disposed in front of the flashing part of a flash photographing device for the purpose of altering a flash illuminating angle.

In a flash photographing device of the kind arranged to determine the aperture value of a photo-taking lens according to the measured level of a reflection light obtained by preliminary flashing and then to control main flashing in accordance with a light control level corresponding to the aperture value thus determined, the light quantity for an object to be photographed decreases due to diffusion of the light of main flashing when the illuminating angle of the main flashing is altered by providing a light diffusing panel in front of a main flashing part as mentioned above. Under such a condition, if a preliminary flashing action is performed in the same manner as in ordinary photographing to determine the aperture value of a photo-taking lens according to the measured level of a reflection light obtained by the preliminary flashing, insufficiency of light quantity might result from main flashing, depending on the distance to the object to be photographed, although the object is within an interrelated light control range with the light diffusing panel used. In the case of ordinary flash photographing with a flash device of, for example, a guide number 16 and with a film of sensitivity of, for example, ASA 100, flash photographing with controlled light quantity can be carried out for objects located at distances up to 4 m by adjusting the aperture value of a photo-taking lens to F4.0 according to a measured level of a reflection light obtained by preliminary flashing. However, when a light diffusing panel is disposed in front of a main flashing part to lower the guide number, for example, to 12, the maximum allowable distance to the object for control light photographing becomes 3 m. If the distance to the object is 3.5 m under this condition, the aperture value of the photo-taking lens would be adjusted to F4.0 in accordance with the measured level of a reflection light obtained by the preliminary flashing. Then, at the time of main flashing, flash photographing would be performed outside of the light controllable range and the photographing operation would result in an underexposure photograph.

SUMMARY OF THE INVENTION

It is therefore an object of the present invention to provide an improved electronic flash device which obviates the above stated disadvantage of prior art devices.

It is another object of the invention to provide an electronic flash device, wherein, when a light diffusing panel is provided in front of a main flashing part for a wider flash illuminating angle, another light diffusing panel which gives a light reducing effect equal to that of the other light diffusing panel is also arranged for a preliminary flashing part to have the light quantity of preliminary flashing reduced in proportion to the degree of the light quantity reduction of main flashing, so that the aperture value to be set by the preliminary flashing can be always set in agreement with the light controllable range of main flashing for photographing.

These and further objects and features of the invention will become apparent from the following detailed description of an embodiment thereof taken in conjunction with the accompanying drawings.

DESCRIPTION OF THE PREFERRED EMBODIMENTS

Figure 1:
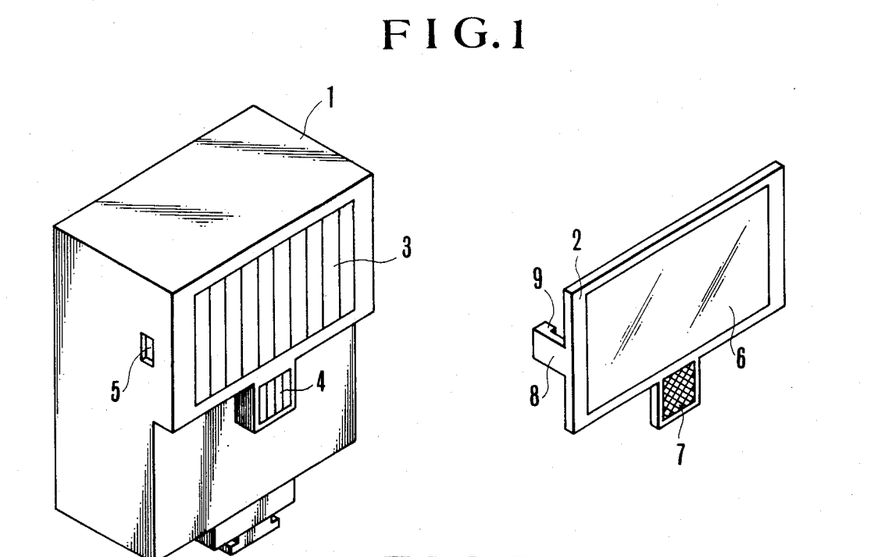
FIG. 1 is a partly exploded oblique view showing a flash device embodying the present invention.

FIG. 1 is an oblique view showing a flash device as an embodiment of the invention. The body 1 of the flash device is provided with a main flashing part 3, a preliminary flashing part 4 and a pair of recessed parts 5 which are disposed on two opposite sides of the main flashing part 3 though one of which is not shown. A light diffusing panel 2 which is arranged to be attached to the body 1 consists of a first light diffusing part 6, a second light diffusing part 7. On two opposite sides of the first light diffusing part 6 are provided a pair of arm parts 8. The arm parts 8 are provided with projections 9 which are disposed in positions to confront the recessed parts 5 respectively.

Figure 2:
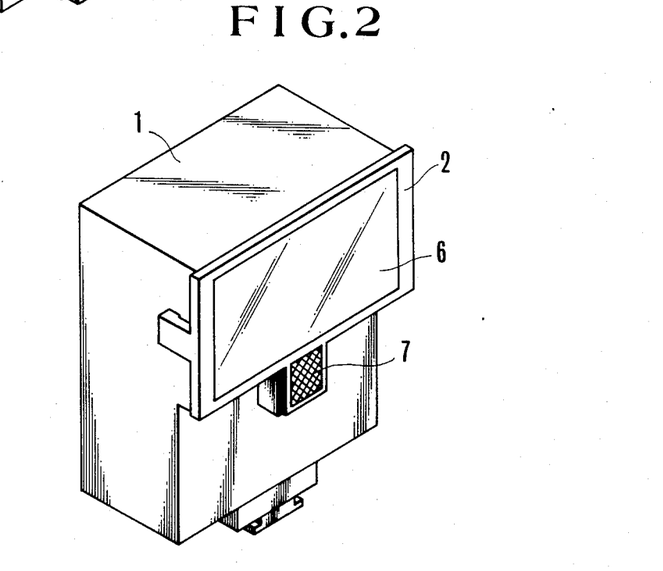
FIG. 2 is an oblique view showing the flash device of FIG. 1 as in a state of having a light diffusing panel attached thereto.

FIG. 2 is an oblique view showing the flash device body 1 as in a state of having the light diffusing panel 2 attached thereto. The light diffusing panel 2 is secured to the body 1 by allowing the projections 9 which are formed at the tips of the arm parts 8 disposed on two sides of the panel 2 to engage the recessed parts provided on the two sides of the main flashing part 3.

In case where a main flashing light and a preliminary flashing light are lights of same characteristic, such as visible rays, the first light diffusing part 6 which is for main flashing and the second light diffusing part 7 which is for preliminary flashing can be formed with materials of the same light diffusing characteristic. However, if, for example, infrared rays or near infrared rays are employed as preliminary flash light for the purpose of avoiding to dazzle an object to be photographed at the time of preliminary flashing, an aperture value set by the preliminary flashing might come to disagree with a photographing light controllable range of main flashing. This discrepancy is believed to be attributable to the light diffusing effect of a light diffusing panel which is less for infrared rays than for visible rays. In such a case, the second light diffusing part 7 must have a greater diffusibility than that of the first light diffusing part 6 by an extent that makes up for the less diffusibility of the infrared rays than the visible rays. Such arrangement prevents flash photographing with insufficient light quantity from occurring, depending on the distance to the object, even when the flash photographing is performed with the light diffusing panel 2 attached to the flash device body 1.

Figure 3:
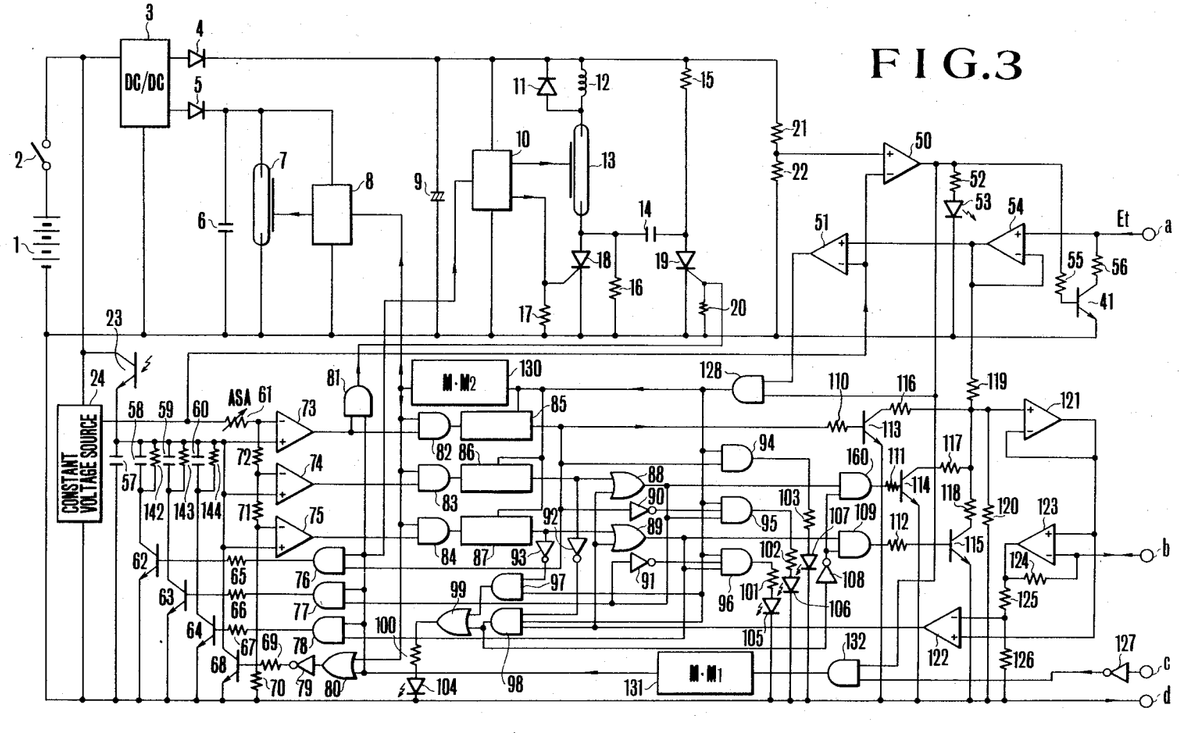
FIG. 3 is a circuit diagram showing the circuit arrangement of the flash device of FIG. 1.

Referring now to FIG. 3, the circuit arrangement of the flash device according to the invention is as described below: The flash device includes a power source switch 2 which is of a normally open type and is series connected to a battery 1. To the switch 2 is connected a known DC-DC converter 3 which is arranged to boost the low voltage of the battery 1. Two rectifying diodes 4 and 5 are connected to the converter 3. The anode of a main thyristor 18 is connected to the cathode side of the diode 4 through a coil 12 and a main discharge tube 13 for flash photographing. To the cathode side of the diode 5 is connected a parallel circuit consisting of an auxiliary discharge tube 7 for distance measurement and an auxiliary capacitor 6 which is arranged to supply the discharge tube 7 with a flashing energy. This auxiliary discharge tube 7 has a trigger circuit 8 connected to the trigger electrode thereof. The trigger circuit 8 has a monostable multivibrator 130 connected to the input terminal thereof. Meanwhile, the above stated main discharge tube 13 has a main capacitor 9 which accumulates a flashing energy connected in parallel thereto. A known trigger circuit 10 is connected to the trigger electrode of the main discharge tube 13. A second output terminal of the trigger circuit 10 is connected to the gate of the above stated main thyristor 18 and to a resistor 17 which is connected to the gate of the trigger circuit 10. Resistors 15 and 16 form a charging path for a commutation capacitor 14. Of these resistors, the resistor 15 is connected also to the anode of an auxiliary thyristor 19 which is arranged to cut off the main thyristor 18. A resistor 20 is connected to the gate of the auxiliary thyristor 19. Resistors 21 and 22 are provided for a voltage dividing circuit which is parallel connected to the main capacitor 9 for the purpose of detecting the charge voltage of the main capacitor 9. There is provided a photo-transistor 23 for receiving a reflection light coming from an object to be photographed (not shown). The photo-transistor 23 is connected to a constant voltage source 24 and to a distance measurement capacitor 57 which is of a relatively small capacity. The above stated voltage dividing circuits 21 and 22 have a comparator 50 connected to the output terminal thereof. The negative input terminal (−) of this comparator 50 and that of another comparator 51 are connected to the output terminal of the constant voltage source 24 to receive a reference voltage therefrom. A light emitting diode 53 (hereinafter a light emitting diode will be called LED for short) is connected to the output terminal of the comparator 50 through a resistor 52 for the purpose of indicating completion of a charging process on the main capacitor 9. A buffer circuit 54 is connected to a connection terminal a which is in turn connected to a terminal disposed on the camera side. The output terminal of the buffer circuit 54 is connected to the positive input terminal (+) of the comparator 51 which is arranged to detect whether or not a shutter release button which will be described hereinafter is depressed to a first stroke position thereof. An npn transistor 41 is connected to the terminal a through a resistor 56. The base of the transistor 41 is connected to the output terminal of the comparator 50 through a resistor 55. The emitter of the transistor 41 is connected to the negative electrode of the above stated battery 1. On the left hand side of the drawing, an element 58 which is series connected to a switching transistor 62 is a capacitor which forms a first time constant circuit of a photometric circuit included in a flash light quantity control circuit. An element 59 which is series connected to another switching transistor 63 is a second capacitor forming a second time constant circuit of the photometric circuit in the flash light quantity control circuit. Another element 60 which is series connected to a switching transistor 64 is a third capacitor forming a third time constant circuit of the photometric circuit for the flash light quantity control. Discharging resistors 142, 143 and 144 which are of high resistance values are respectively connected to these light quantity controlling capacitors 58, 59 and 60 to form an integration circuit for light quantity control. Compared with the afore-mentioned distance measurement capacitor, the light quantity control capacitors 58, 59 and 60 have a larger capacity. While the light control level of the light control integration circuit is arranged in three steps in this particular embodiment, the present invention is not limited to this arrangement. Base resistors 65, 66 and 67 are respectively connected to the bases of transistors 62, 63 and 64. There is provided an npn transistor 68 which becomes non-conductive at the same time as the start of preliminary flashing and that of main flashing to actuate the above stated photometric circuit concurrently with the starts of the preliminary and main flashing actions. A resistor 69 is connected to the base of this transistor 68. Comparators 73, 74 and 75 are arranged to select the light control level, i.e. an aperture value to be used. Resistors 70, 71 and 72 for supplying reference voltages are respectively connected to these comparators 73, 74 and 75. A resistor 61 is arranged to have its resistance value vary according to a setting value of film sensitivity. AND gates 76, 77 and 78 are respectively connected to the bases of the transistors 62, 63 and 64 through the resistors 65, 66, 67 for rendering one of these transistors 62-64 conductive in synchronism with generation of a flashing trigger signal which will be described hereinafter. An OR gate 80 is connected to the base of the switching transistor 68 through an inverter 79 and the resistor 69. An AND gate 81 is connected between the comparator 73 and the auxiliary thyristor 19 for the purpose of guiding to the gate of the auxiliary thyristor 19 a flashing stop signal produced from the comparator 73. There are further provided AND gates 82, 83 and 84 which are arranged to guide light control level selection signals i.e. aperture value selection signals, produced from the comparators 73, 74 and 75 to latch circuits 85, 86 and 87 respectively. The output terminal of the AND gate 82 is connected to the gate of a thyristor which forms the latch circuit 85. The output terminal of the AND gate 83 is connected to the gate of a thyristor which forms the latch circuit 86. The output terminal of the AND gate 84 is connected to the gate of another thyristor which forms the latch circuit 87. With the latch circuits 85-87 thus formed by these thyristors, the anode of the thyristor forming the latch circuit 85 is connected to the output terminal of an AND gate 128 while the cathode thereof is connected to the base of a transistor 113 through a resistor 110. The anode of the thyristor forming the latch circuit 86 is connected to the output terminal of the AND gate 128 while the cathode thereof is connected to the base of a transistor 114 through an OR gate 88, an AND gate 160 and a resistor 111. Further, the anode of the thyristor forming the latch circuit 87 is connected to the output terminal of the AND gate 128 while the cathode thereof is connected to an OR gate 89. There are provided inverters 90, 91, 92 and 93. LED's (light emitting diodes) 105, 106 and 107 are connected to AND gates 94, 95 and 96 through resistors 101–103. These elements are arranged to indicate the selected light control level, or, in other words, the selected aperture value prior to main flashing. An inverter 108 is connected to AND gates 109 and 160. Base resistors 110–112 are connected to the bases of npn transistors 113–115. Resistors 116–118 are provided for the purpose of producing a voltage corresponding to the selected aperture value. A reference numeral 119 indicates a resistor. Another resistor 120 is provided for forming a voltage dividing circuit which is parallel connected respectively to the above stated resistors 116–118. A buffer circuit 121 is connected to the connection point of the above stated resistors 119 and 120 which voltage divide the output of the above stated buffer circuit 54. This buffer circuit 121 is arranged to have the voltage of its non-inversion input terminal produced therefrom as it is. A comparator 122 is arranged to determine a signal of the full aperture F-number of the lens received from the camera side through a terminal b. Resistors 125 and 126 form a voltage dividing circuit for supplying a reference voltage to the negative input terminal of this comparator 122. An operational amplifier 123 has its non-inversion input terminal connected to the output terminal of the above stated buffer circuit 121 and also has a resistor 124 connected between its output terminal and its inversion input terminal. The operational amplifier 123 is arranged such that the non-inversion input terminal voltage thereof is produced without any change at the inversion input terminal thereof. In other words, the voltage of its non-inversion input terminal becomes an aperture signal to be supplied from the flash device to the camera side through the terminal b as will be further described later herein.

The above-mentioned comparator 122, bleeder resistors 125 and 126 and the above-mentioned amplifier 123 constitute a detection circuit which detects the information on the full aperture F-number of the lens disposed on the camera side. The above-mentioned terminal b is connected to a source of the maximum or full aperture F-number information disposed on the camera side. The above-mentioned detection circuit is arranged to detect the full aperture F-number of the lens by detecting the value of the impedance Z of the full aperture F-number information source. Meanwhile, the comparator 122 is arranged to produce a low level signal when the full aperture F-number of the lens is or a smaller value than the designated aperture value, that is, when the lens is brighter than the designated aperture value, and to produce a high level signal when the lens is darker than the aperture value.

Between a synchronizing terminal c for a flashing trigger signal and the input terminal of an AND gate 132, there is connected an inverter 127. A monostable multivibrator 131 (hereinafter a monostable multivibrator will be called a one-shot circuit) is connected to an OR gate 80. Numerals 97 and 98 indicate AND gates; and 104 indicates an LED. The LED 104 is connected to an OR gate 99 through a current limiting resistor 100 and is arranged to give a warning against an under exposure. The terminal a mentioned in the foregoing is arranged to be supplied with a constant voltage from the camera side when the shutter release button of the camera is depressed to the first stroke position thereof. With this constant voltage thus supplied to the terminal a, the terminal a uses this voltage for transmitting either a photographing mode change-over signal or a shutter time change-over signal to the camera side as will be described later herein. The terminal b which transmits the voltage corresponding to the selected aperture value from the flash device to the camera side as mentioned in the foregoing also serves to have a signal which represents the full aperture F-number of the photo-taking lens in use and comes from the camera side transmitted therethrough to the processing circuit of the flash device. The synchronizing terminal c is arranged in a known manner. Another terminal d is a grounding terminal.

Figure 4A:
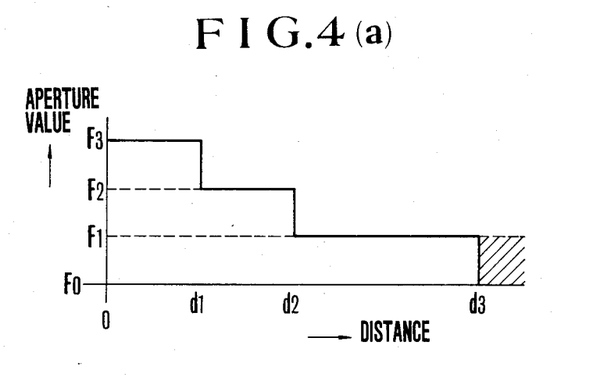
FIGS. 4(a), 4(b), 5(a), 5(b) and 5(c) are illustrations of the operation of the flash device shown in FIGS. 1 and 3.
Figure 4B:
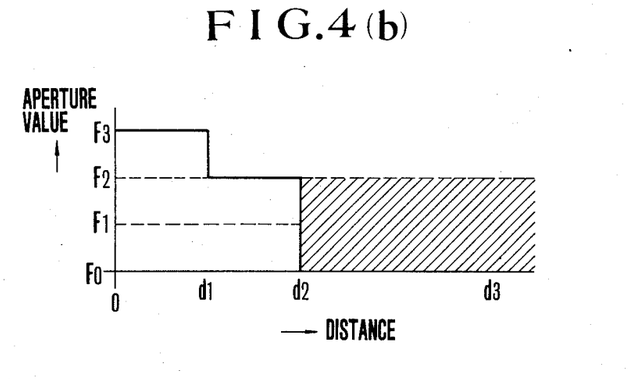

To make the present invention more easily understandable, the operation of the flash device arranged as described above will be described below with reference to FIGS. 3 through 5 before description of the camera of the flash photographic system according to the invention:

Referring to FIGS. 4(a) and 4(b) which show the relation of the distance from the flash device to an object to be photographed to the aperture value to be selected, FIG. 4(a) shows the relation as it obtains when a relatively bright lens is used while FIG. 4(b) shows the relation as it obtains when a relatively dark lens is used. In these drawings, the axis of abscissa indicates the distance while the axis of ordinate indicates the aperture value.

Figure 5A:
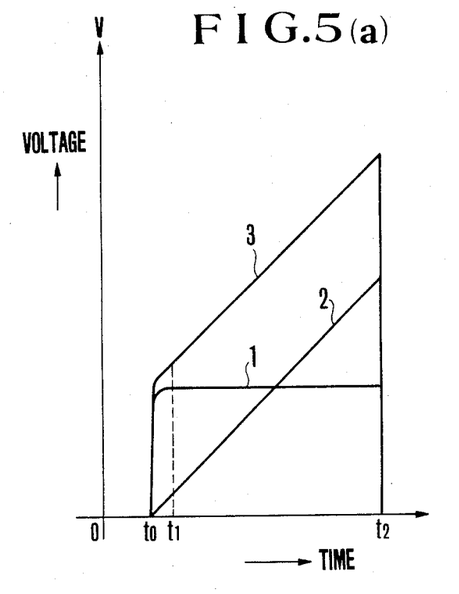
Figure 5B:
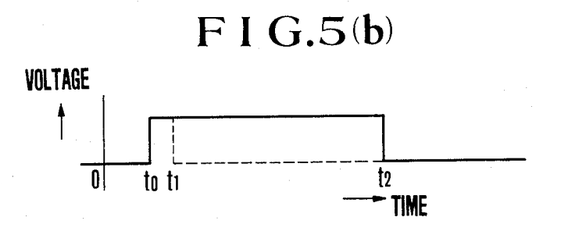
Figure 5C:
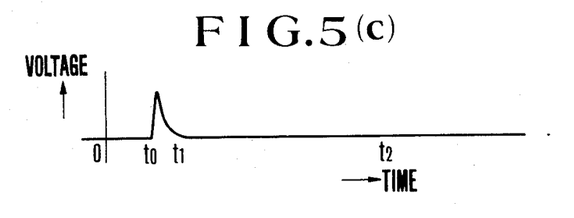

FIG. 5(a) shows the charge voltage characteristic of the distance measurement capacitor 57 with time shown by the axis of abscissa and the charge voltage by the axis of ordinate. In FIG. 5(b) which shows the output wave form of the one-shot circuit 130, the generation period t0–t2 thereof is, for example, several ten μs. In FIG. 5(c) which shows the charge characteristic of the auxiliary discharge tube 7, the discharge time t0–t1 thereof is, for example, about 10 μs. Referring to FIG. 5(a), a line 1 represents variations in the charge voltage of the capacitor 57 in a case where light measuring time is several tens of μs, the brightness of a natural light illuminating the object is low and the object is located at a medium distance. A line 2 represents the variations in a case where the light measuring time is the same as the line 1, the object is located at a long distance and the brightness of the natural light is high. Another line 3 represents the variations in a case where the light measuring time is the same as the line 1, the brightness of the natural light is high and the object is located at a medium distance. Comparison of these lines or wave forms 1 and 3 indicates that, where the light measuring time is about 10 μs, the variations in the charge voltage of the capacitor 57 are under the influence of a reflection light which comes from the object and solely results from flashing, i.e. the variations are influenced by the components of the reflection light resulting from the reflection factor of the object and the measuring distance. However, the variations come to be more and more influenced by the natural light on the background of the object according as the light measuring time increases. Accordingly, in the case of the line 3 or wave form 3 shown in FIG. 5(a), flash photographing at an exposure which is adequate not only for the flash light but also for the natural light can be accomplished by changing the light measuring time, i.e. the one-shot pulse width, and thus by setting an aperture value according to the reflection light components resulting from the distance, the reflection factor of the object and the natural light on the background. This arrangement gives an especially good effect for a back-light shot.

First, in case where the photo-taking lens mounted on the camera is a relatively bright lens, the embodiment operate in the following manner: The impedance of the information source of the full aperture F-number of the camera is detected in a manner as will be described later herein. Then, in this case, the comparator 122 produces a low level signal therefrom. Assuming that the resistance value of the resistor 125 is R1, that of the resistor 126 R2, that of the resistor 124 R3, the impedance between the terminal b on the camera side and the ground is Z, the voltage of the terminal b on the flash device side is $V_{AV}$, the output of the amplifier 123 $V_{OUT}$ and the potential at the connection point of the resistors 125 and 126 is Vr, there obtains the following relation:

$$Vr = V_{OUT}\frac{R2}{R1 + R2} \quad V_{OUT} = V_{AV}\left(1 + \frac{R3}{Z}\right)$$

Since the condition under which the output of the comparator 122 become a low level (hereinafter will be called LL) is $Vr > V_{AV}$, there obtains the following relation:

$$V_{AV}\left(\frac{R2}{R1 + R2}\right)\left(1 + \frac{R3}{Z}\right) > V_{AV}$$

Then, this gives the following relation:

$$Z < \frac{R3R2}{R1} = C$$

(a constant value). Therefore, use of a bright lens can be considered to result in a relation $$Z < \frac{R2R3}{R1}$$

and that of a dark lens to result in a relation of $$Z > \frac{R2R3}{R1}.$$

As described above, the information on the full aperture F-number of the lens in use is transmitted from the camera side to the flash device via the terminal b through the variation in the impedance. Then, information on the light control aperture value is transmitted from the flash device to the camera side through the variation of voltage also via the terminal b. This arrangement permits reduction in the number of connection terminals required between the camera and the flash device.

The following description is based on the assumption that the photo-taking lens mounted on the camera is a bright lens, such as a lens of full aperture F-number between F1.4 and F2.0; the output of the comparator 122 is at an LL; the output of the AND gate 98 is also at an LL; and the output of the inverter 108 is at a high level (hereinafter will be called HL for short). Let us also assume that the guide number of the flash device is, for example, 16.

With the flash device shown in FIG. 3 mounted on a hot shoe (not shown) of the camera, when the power source switch 2 is closed, the DC-DC converter 3 and the constant voltage source 24 begin to operate. The main capacitor 9, the auxiliary capacitor 6, etc. begin to be charged. When the charge voltage of the main capacitor 9 reaches a predetermined value to cause the output level of the comparator 50 to change from LL to HL, the LED 53 lights up to indicate completion of the charging process on the main capacitor 9. Then, a high level voltage of is impressed on the base of the transistor 41 to render the transistor 41 conductive.

Following this, a constant voltage is impressed on the terminal a via the hot shoe of the camera when the photographer depresses the shutter release button (not shown) to the first stroke position thereof. (With the shutter release button in this position, a release action on the shutter and an adjusting action on the aperture of the photo-taking lens do not begin. It is only a photometric circuit, a display circuit, etc. arranged within the camera that begin to operate then). With the constant voltage impressed, the transistor 41 becomes conductive and a shutter time changeover signal is transmitted to the camera side to shift the shutter time control circuit of the camera from a natural light photography mode to a flash photography mode as will be further described later herein. Meanwhile, the constant voltage produced at the terminal a is also impressed on the positive input terminal (+) of the comparator 51 through the buffer circuit 54. This causes the output level of the comparator 51 to change from an LL to an HL. This causes the one-shot circuit 130 to be triggered through the AND gate 128. The circuit 130 then produces an HL output voltage over a predetermined period of time t2-t0 which is, for example, several tens of μs as shown in FIG. 5(b). Accordingly, the trigger circuit 8 is triggered the instant the pulse is produced from the one-shot circuit 130. With the trigger circuit 8 thus triggered, the output terminal of the circuit 8 produces a trigger pulse, which triggers the auxiliary discharge tube 7. Since the auxiliary capacitor 6 has been charged to a sufficiently high voltage at that instant, a current flows from the capacitor 6 to the auxiliary discharge tube 7 upon receipt of the trigger pulse. The tube 7 then begins to perform a preliminary flashing action.

Meanwhile, the pulse output from the one-shot circuit 130 is also impressed on the AND gates 82-84 and the OR gate 80. This brings the AND gates 82-84 into a waiting state and also renders the transistor 68 nonconductive through the inverter 79 and the resistor 69. With the transistor becoming non-conductive, the distance measuring capacitor 57 is released from a short-circuit state. Then, the distance measuring photometric circuit begins to operate concurrently with the commencement of the preliminary flashing action mentioned above. Further, since the flashing trigger signal of LL is not impressed on the synchronizing terminal c at that time, the one-shot circuit 131 remains inoperative and the gates of the AND circuits 76-78 are closed. Accordingly, all the transistors 62-64 remain non-conductive and all the light controlling capacitors 58-60 are inoperative. In other words, it is only the integrating capacitor 57 that is operating.

After preliminary flashing has begun, when the light from the discharge tube 7 is reflected by the object and comes to the photo-transistor 23, the output voltage of the distance measuring capacitor 57 increases with time and according to a photo current flowing through the photo-transistor 23. About several tens of μs after the commencement of the preliminary flashing, the charge voltage of the capacitor 57 during the distance measuring process is latched at the latch circuits 85-87 as distance information as the output level of the one-shot circuit 130 changes to LL. If the object is located at a distance within the distance range of d2m-d3m (for example, 4m-8m) as shown in FIG. 4(a) with the guide number of the flash device assumed to be 16 as mentioned in the foregoing, the charge voltage of the capacitor 57 causes the output level of the comparator 75 alone to become HL. This in turn causes the output level of the latch circuit 87 alone to become HL. Therefore, the output levels of the output terminals of the OR gate 89 and the AND gate 109 respectively become HL. Then, the transistor 115 alone becomes conductive to parallel connect the resistor 118 to the resistor 120. At this point of time, since the constant voltage from the terminal a has been impressed through the buffer circuit 54 on the resistors 119 and 120, the potential of the positive input terminal of the buffer circuit 121 drops according to the resistance value of the resistor 118 if the resistor 118 which is for setting the aperture value at F1, corresponding to F2.0 for example, is then parallel connected to the resistor 120. Then, the potential of the non-inversion input terminal of the amplifier 123 also drops accordingly. As a result of that, a voltage which causes the aperture of the photo-taking lens of the camera to be adjusted to the aperture value F1 is produced at the terminal b.

With the output level of the OR gate 89 having become HL as mentioned above, the output level of the AND gate 78 becomes HL and the transistor 64 becomes conductive. In other words, the flash light quantity control circuit of the flash device becomes ready to be set at a light control level corresponding to the aperture value F1.

Further, when the output level of the OR gate 89 becomes HL, the output levels of the comparator 51 and the AND gate 128 become HL and that of the latch circuit 86 LL. Therefore, the output level of the AND gate 96 becomes HL. The LED 105 lights up to inform the photographer that the aperture of the photo-taking lens of the camera and the light control level (or aperture value) of the flash device will be adjusted to the above stated aperture value F1.

In case where the distance to the object is within another distance range d2m-d1m (for example, between 2m and 4m) shown in FIG. 4(a), the charge voltage of the capacitor 57 causes the output level of the comparator 75 and that of the comparator 74 to be come HL. Accordingly, the output levels of the latch circuits 86 and 87 become HL and, therefore, those of the AND gates 160 and 109 are caused to become HL through the OR gates 88 and 89. The transistors 114 and 115 then become conductive. With these transistors 114 and 115 becoming conductive, the aperture setting resistors 117 and 118 are parallel connected to the resistor 120 of the voltage dividing circuit. With the resistors 117 and 118 thus parallel connected to the resistor 120, the potential of the positive input terminal of the buffer circuit 121 drops to an extent according to the resistance value of the two resistors 117 and 118 now parallel connected to the resistor 120. The potential of the non-inversion input terminal of the amplifier 123 also drops accordingly.

As a result of this, there is produced at the terminal b a voltage of such a value that causes the aperture of the photo-taking lens of the camera to be adjusted to an aperture value F2 which is smaller than the aperture value F1 (see FIG. 4(a)) and, for example, corresponds to F4.0. Further, when the output levels of the OR gates 88 and 89 become HL as mentioned above, the level of one of input terminals of each of the AND gates 77 and 78 becomes HL to render the transistors 63 and 64 conductive respectively. The flash device thus becomes ready to be set for the above stated aperture value F2.

When the output levels of the OR gates 88 and 89 change to HL as mentioned above, the output level of the AND gate 128 becomes HL and that of the latch circuit 85 LL. Therefore, among the AND gates 94-96, the output level of the gate 95 alone becomes HL. Then, the LED 106 lights up to inform the photographer that the aperture of the photo-taking lens of the camera and the light control level (or aperture value) of the flash device will be adjusted to the above stated aperture value F2.

If the distance to the object is within a range d1m-0m shown in FIG. 4(a) which corresponds, for example, to 0m-2m, the charge voltage of the capacitor 57 causes the output levels of the comparators 75, 74 and 73 to respectively become HL. Accordingly, the output levels of all the latch circuits 85-87 become HL. The output levels of the OR gates 88 and 89 and those of the AND gates 109 and 160 become HL. The transistors 113-115 become conductive to parallel connect the aperture value setting resistors 116, 117 and 118 to the resistor 120 of the voltage dividing circuit. With the resistors 116-118 parallel connected to the resistor 120, the potential of the positive input terminal of the buffer circuit 121 drops to an extent according to the resistance value of the resistors 116-118 parallel connected to the resistor 120. The potential of the non-inversion input terminal of the amplifier 123 also drops according as that of the buffer circuit 121 drops.

As a result of this, at the terminal b, there is produced such a voltage that causes the aperture of the photo-taking lens of the camera to be adjusted to an aperture value F3 which is smaller than the above stated aperture value F2 (see FIG. 4(a)) and which corresponds, for example, to F8.0 in F-number.

With the output level of the latch circuit 85 becoming HL and those of the OR gates 88 and 89 having become HL as mentioned in the foregoing, the level of one of input terminals of each of the AND gates 76, 77 and 78 becomes HL to render the transistors 62-64 conductive respectively. In other words, the flash device thus becomes ready to be set for the above stated aperture value F3.

Since the output of the AND gate 128 is at an HL with that of the latch circuit 85 having become HL, the LED 107 alone lights up to inform the photographer that the photo-taking aperture of the camera and the light control level (aperture value) of the flash device will be adjusted to the above stated aperture value F3.

Further, since the output of the latch circuit 85 is then at an HL as mentioned above, the output of the inverter 90 is at an LL. Accordingly, the output level of the AND gate 95 becomes LL and the LED 106 does not light up. Further, since the output of the latch circuit 86 is at an HL as mentioned above, that of the OR gate 88 is an HL and that of the inverter 91 is at an LL. Accordingly, the LED 105 also does not light up.

Again referring to FIG. 4(a), when the distance to the object is farther than a distance d3, none of the output levels of the comparators 73–75 become HL even after the lapse of time of several tens of μs which is determined by the output of the one-shot circuit 130. In this case, therefore, the transistor 113 is kept in a non-conductive state by the LL output of the latch circuit 85. Since the output of the latch circuit 86 is at an LL, that of the AND gate 98 at an HL and that of the inverter 108 at an LL, the outputs of the AND gates 160 and 109 are at LL's. With the object located at such a distance, therefore, all the transistors 113–115 which are arranged to determine the aperture value of the photo-taking lens (not shown) remain in their non-conductive states. Meanwhile, a voltage which corresponds to an aperture value F0 (see FIG. 4(a)), or F1.0 in F-number, for example, and which is determined by the voltage dividing ratio of the voltage dividing circuit 119 and 120 is transmitted from the amplifier 123 through the terminal b to an aperture control circuit of the camera which will be described later herein. Further, since the output of the latch circuit 87 is also at an LL and that of the AND gate 97 is at an HL at this moment, the LED 104 lights up to inform or warn the photographer than the object is beyond a flash photographing range.

In case where a dark lens, i.e. a lens of a relatively large full aperture F-number, such as F4.0, is mounted on the camera, the embodiment operates in the following manner: The potential of the positive input terminal (+) of the comparator 122 is higher than that of the negative input terminal (−) of the comparator in that case. The level of the output terminal of the comparator 122 becomes HL. Then, the levels of the output terminals of OR gates 88 and 89 are forced to become HL. After completion of the charging process on the main capacitor 9, when the shutter release button (not shown) is depressed to the first stroke position thereof, the one-shot circuit 130 is triggered in the same manner as in the preceding case. The one-shot circuit produces an HL signal for a period of several tens of μs. The transistor 68 then changes to a non-conductive state as mentioned in the foregoing to render thereby the distance measuring photometric circuit operative. Meanwhile, when the HL signal is produced from the one-shot circuit 130, the discharge tube 7 flashes to perform the preliminary flashing in the same manner as has been described in the foregoing.

Under this condition, when the object is located at a distance farther than the distance d2 (see FIG. 4(b)) which is, for example, 4m, an HL input is impressed on one of the input terminals of each of the AND gates 77 and 78 because the output levels of the OR gates 88 and 89 have been forced to become HL by the HL output of the comparator 122. Therefore, the transistors 63 and 64 are in their conductive states. In other words, in the photometric circuit of the flash light quantity control circuit (hereinafter will be called the light control circuit), the capacitors 59 and 60 are selected. As a result of that, the circuit becomes ready to be set at a light control level for a relatively dark aperture value F2 which, for example, corresponds to F4.0 in F-number.

Although the output levels of the OR gates 88 and 89 are HL, the LL output of the latch circuit 86 causes the level of the AND gate 98 to become HL. The transistors 114 and 115 then become non-conductive and resistors 119 and 120 are selected for aperture value setting. Accordingly, at the terminal b, there is produced a voltage of a value that causes the aperture of the photo-taking lens to be adjusted to the aperture value F0. The lens is thus forcedly set at its full aperture, which is F4.0.

After the shutter release button has been released from the depressing operation, when the button is again depressed to the first stroke position thereof, a predetermined constant voltage is impressed on the terminal a from the camera side. If the charging process on the main capacitor 9 has been completed by then, again preliminary flashing is performed to carry out a distance measuring action once again in the same manner as has been described in the foregoing.

With the preliminary flashing performed in the manner as has been described above and after this action and the actions for adjusting the photo-taking lens and for setting the light control level of the flash device have been confirmed, a mirror (not shown) is uplifted as will be described later herein when the shutter release button is further depressed to a second stroke position thereof. Also, with the release button depressed to the second stroke position, the diaphragm aperture of the photo-taking lens (not shown) is determined according to the aperture value determined by the above stated preliminary flashing action. After these actions and other known actions have been performed, when a shutter (not shown) is fully opened and a synchronizing contact (not shown) is operated, the synchronizing terminal c is grounded. Then, the AND gate 132 changes to an HL, the one-shot circuit 131 is triggered. The circuit 131 produces an HL signal for a length of time required for flash photographing, for example, for a period of 5 to 6 ms. Therefore, the transistor 68 which has become conductive in synchronism with the rise of the signal from the one-shot circuit 130 again becomes non-conductive to render thereby the photometric circuit of the light control circuit operative. Since the signal from the one-shot circuit 131 triggers the trigger circuit 10, an electrical energy is supplied from the main capacitor 9 to the main discharge tube 13 in a known manner. The discharge tube flashes to illuminate the object to be photographed. With the main flashing action begun in this manner, a reflection light which comes from the object as a result of the main flashing reaches the photo-transistor 23. Then, the capacitor 57 of the distance measuring photometric circuit and the capacitor which has been selected at the time of preliminary flashing, i.e. the capacitor 60 for example, begin to be charged. When the charge levels of these capacitors 57 and 60 reach a predetermined level, the output level of the comparator 73 becomes HL. This causes the output level of the AND gate 81 to become an HL. The HL output of the AND gate 81 triggers the thyristor 19 to interrupt the main flashing in a known manner to ensure a proper exposure for the flash photographing operation.

In accordance with this invention, as has been described in the foregoing, when a light diffusing panel is disposed at the main flashing part, another light diffusing panel having the same light reducing effect is disposed also at the preliminary flashing part. The quantity of preliminary flashing light is thus reduced in proportion to reduction in the main flashing light quantity. This arrangement enables the flash device to perform continuous flash photographing within a light controllable photographing range according to an aperture value set by the preliminary flashing.

Further, in case where either infrared rays or near infrared rays are used for the preliminary flashing, the light diffusing panel to be disposed in front of the preliminary flashing part is arranged to have a greater light diffusing effect than the light diffusing panel to be disposed in front of the main flashing part in such a manner as to diffuse the preliminary flash light in proportion to that of the main flash light, so that the aperture value set by the preliminary flashing can be always in agreement with the photographing light controllable range of the main flashing. Therefore, use of infrared rays or near infrared rays for preliminary flashing presents no problem for carrying out flash photographing with the light diffusing panel.

Such being the arrangement according to the invention, bounce photographing can be carried out by altering the flash illuminating angles of preliminary flashing and main flashing without any problem.

What we claim:

1. An electronic flash device comprising:
   (a) a package housing at least part of said flash device;
   (b) first flash means on said package for emitting substantially infrared light;
   (c) second flash means on said package and positioned adjacent said first flash means; and
   (d) a diffusion panel, when attached, for covering both of said first flash means and said second flash means, having a first part for covering said first flash means and a second part for covering said second flash means, said first part having a coefficient of diffusion different from said second part.

2. An electronic flash of claim 1, wherein the diffusion coefficient of said first part of said diffusion panel is larger than the diffusion coefficient part of said second part.

3. An electronic flash of claim 2, wherein said diffusion panel is formed to unified shape.

4. An electronic flash device comprising:
   (a) a package housing at least part of said flash device;
   (b) first flash means on said package for emitting a light;
   (c) second flash means on said package, said second flash means emitting a light of different diffusion characteristic from that of the light from said first flash means; and
   (d) a diffusion panel, when attached, for covering both of said first flash means and said second flash means, having a first part for covering said first flash means and a second part for covering said second flash means, said first part having a coefficient of diffusion different from said second part.

5. An electronic flash device comprising:
   (a) a package housing at least part of said flash device;
   (b) first flash means on said package for emitting a light;
   (c) second flash means on said package, said second flash means emitting a light of different diffusion characteristic from that of the light from said first flash means; and
   (d) a diffusion panel for covering both of said first flash means and said second flash means, having a first part for covering said first flash means and a second part for covering said second flash means, said first part having a coefficient of diffusion different from

* * * * *